United States Patent [19]
Jenkins et al.

[11] Patent Number: 5,558,193
[45] Date of Patent: Sep. 24, 1996

[54] BALL-TYPE AUGER RATCHET MECHANISM FOR AGITATOR/AUGER SYSTEMS

[75] Inventors: Harold J. Jenkins, Amsterdam; Robert E. Sundell, Clifton Park; Sudhir D. Savkar, Niskayuna, all of N.Y.

[73] Assignee: General Electric Company, Schenectady, N.Y.

[21] Appl. No.: 283,380

[22] Filed: Aug. 1, 1994

[51] Int. Cl.$^6$ .......................... D06F 17/08; D06F 37/40; F16D 41/061
[52] U.S. Cl. ................... 192/45; 68/23.7; 74/126; 192/89.1
[58] Field of Search ..................... 74/126; 68/133, 68/23.7; 192/45, 89.1

[56] References Cited

U.S. PATENT DOCUMENTS

| | | | |
|---|---|---|---|
| 1,270,570 | 6/1918 | Van Ness | 192/45 |
| 1,375,576 | 4/1921 | Duca | 192/45 X |
| 1,775,832 | 9/1930 | Schenck | 192/45 X |
| 2,255,505 | 9/1941 | Dunham | 68/133 X |
| 2,821,840 | 2/1958 | Hays | 68/133 X |
| 3,987,652 | 10/1976 | Ruble | 74/126 X |
| 4,223,771 | 9/1980 | Petersen | 192/10 X |
| 4,719,769 | 1/1988 | Pielemeier et al. | 74/126 X |
| 4,837,882 | 6/1989 | Brenner et al. | 192/18 R X |
| 4,856,303 | 8/1989 | Hood et al. | 74/126 X |

*Primary Examiner*—Rodney H. Bonck
*Attorney, Agent, or Firm*—Paul R. Webb, II

[57] ABSTRACT

A novel ball-type auger ratchet mechanism which may be used with washer agitators and augers. More particularly this mechanism comprises a top cap, a simplified cam, and a plurality of balls. The structures described have fewer parts than conventional auger ratchet mechanisms, and ultimately are easier to assemble and cost less. Furthermore, both embodiments of the instant invention, use mechanical means to achieve a positive locking and non-slipping action, rather that the conventional frictional force mechanisms.

7 Claims, 3 Drawing Sheets

BALL-TYPE AUGER RATCHET MECHANISM FOR AGITATOR/AUGER SYSTEMS

BACKGROUND OF THE INVENTION

This invention relates to a novel mechanism capable of being used in mechanical apparatuses. More particularly, this mechanism comprises a top cap having a plurality of receptacles, a matching cam positioned beneath said cap, and a plurality of balls. Said mechanism may be employed with washing machine agitator/auger systems.

Auger ratchet mechanisms, in general, are employed in mixing apparatuses. They rotate in one direction while the agitators they are connected to oscillate back and forth. Such a result is often desirable since it yields maximum stirring/mixing. In the past, many different combinations have been utilized to reach this desired result.

Conventional auger ratchet/clutch mechanisms, generally employ a large number of interrelated parts to create this rotation/oscillation effect. Having a large number of components within a mechanism adds to the complexity of the mechanism and results in a more involved assembly. Furthermore, extra time must be devoted to an involved assembly resulting in a substantial amount of labor, and an increase in overall cost of the mechanism.

Additionally, many of the conventional auger ratchet/clutch mechanisms use frictional force devices to restrict ratchet movement within a ratchet housing. Using frictional force devices to restrict movement becomes a problem when extended over the entire life of the product. This is true because the coefficient of friction of the restricting device varies over the life of the product because of wear, or more frequently because of foreign substances being introduced into the system, such as laundry detergent and water. Ultimately, this results in a diminished performance of the mechanism over time.

Accordingly, there is a need for an improved auger ratchet mechanism which does not rely on frictional means to restrict the movement and which has an uncomplicated assembly. This improved auger ratchet mechanism would ultimately last longer, save time during manufacturing, and inevitably result in an overall cost savings for the consumer.

SUMMARY OF THE INVENTION

The above-mentioned needs are met by the present invention which relates to a novel apparatus which may be used with a washing machine agitator/auger system. More particularly, the apparatus comprises a top cap having a plurality of receptacles, a matching cam positioned beneath said cap, and a plurality of ball bearings. This novel apparatus provides a simple, durable, and cost effective means for creating rotation of the auger from the oscillating motion of the agitator.

The components of the instant invention are novel yet simplistic in design. The top cap and the simplified cam may both be formed using a single draw mold, creating a more efficient process which equates to a lower manufacturing cost.

Furthermore, each embodiment of the instant invention employs a mechanical means for restricting movement within the mechanism, rather than a frictional means. This novel advancement results in an improved apparatus which will have consistent performance over the entire life of the product. This result differs from the conventional frictional force systems, which tend to have a diminishing effectiveness over time.

Other objects and advantages of the present invention will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
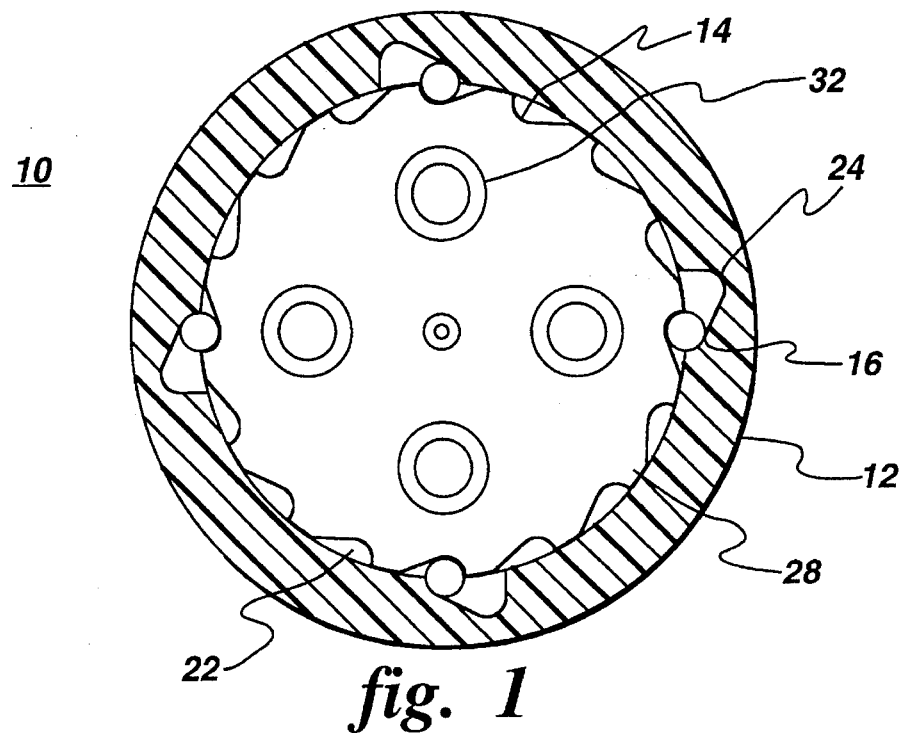
FIG. 1 is a partial cross-section view of a first embodiment of a ball-type auger ratchet mechanism of the instant invention taken on line 2—2 of FIG. 2.
Figure 2:
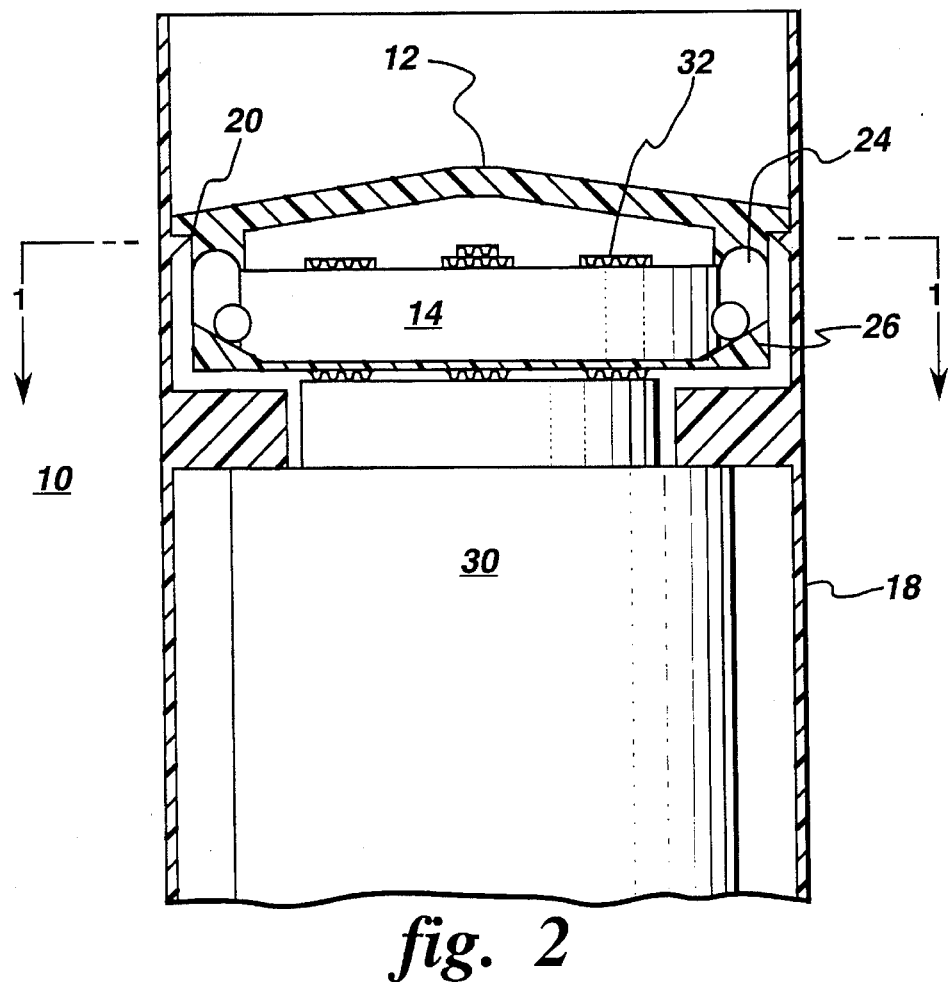
FIG. 2 is a partially cutaway side view of a first embodiment of a ball-type auger ratchet mechanism within an auger/agitator system.

Referring now to the drawings wherein like numerals indicate like elements throughout. FIGS. 1 and 2 of the drawings depict a first embodiment of a ball-type auger ratchet mechanism 10 which may be employed with a washing machine agitator/auger system. Said mechanism 10 is comprised of a top cap 12, a simplified cam 14 positioned therein, and a plurality of balls 16.

Said top cap 12, is generally cylindrical in shape, having a top closed end and a bottom open end. Said top cap 12 should be made of a specified material which is capable of being simply cast using a single draw mold. The preferred material is often plastic such as filled or unfilled polypropylene. The most preferred material being polypropylene.

Said cap 12 is attached to an auger 18 by a connecting means. Most preferred connecting means to attach said cap 12 to said auger 18 is by using a spin weld 20.

Each cap 12 has an interior surface 22 having a plurality of pocket cavities 24 therein. Each pocket cavity 24 has one ball 16 positioned therein. In the most preferred embodiment, the cap 12 should have four pocket cavities 24 with four balls 16 positioned therein. Magnets may be used during assembly of said ball-type auger ratchet mechanism 10 to hold said balls 16 in place. By so doing, said ball-type auger ratchet mechanism 10 will not have to be turned upside down during assembly.

In another preferred embodiment the cap 12 should have eight pocket cavities 24 with eight balls 16 positioned therein. The cavities 24 being arranged such that a first set of four cavities 24 are positioned at 0°, 90°, 180°, and 270° and the second set of four cavities 24 are offset by a fixed angle. In a most preferred arrangement, the second set of four cavities 24 are offset from the first set of four cavities 24 by 22.5° such that said second set of four cavities 24 fall at 22.5°, 112.5°, 202.5°, and 292.5°.

Said pocket cavities 24 have a cam ledge 26 which is located at the bottom of said pocket cavities 24. The cam ledge 26 has a tilt downwards towards said cam 14 to ensure engagement of said balls 16 during clockwise movement of said cam 14.

Said balls 16 should be made of a either metal, glass, or plastic. In preferred embodiments, either metal or glass balls 16 may be used. In most preferred embodiments, chromium plated or stainless steel balls 16 may be used. If magnets are incorporated into said mechanism, 400 series 3/16" stainless steel balls should be used to avoid corrosion and still be able to be used with the magnets.

Said cam 14 is generally cylindrical in shape and has a plurality of outwardly extending teeth (or lobes) 28. Said cam 14 should be made of a specified material which is capable of being simply cast using a single draw mold. The preferred material is often plastic such as filled polypropylene, unfilled polypropylene, or a polyoxymethylene polymer. The most preferred material being a polyoxymethylene polymer.

Said cam 14 rotates generally in a horizontal plane, and is fixedly attached to an agitator 30 by a connecting means. Attaching said cam 14 to said agitator 30 with a plurality of bosses 32 is the preferred connecting means. Using a vibration welding technique to attach said bosses 32 with said cam 14 and said agitator 30 is the most preferred connecting means.

An auger should preferably move in only one direction, allowing a mechanism to turn and churn a work product (for example clothing). An agitator on the other hand does not move in only one direction, but simply oscillates back and forth to create maximum stirring/mixing. During operation in a washing machine, said first auger ratchet mechanism 10 may be mounted as such:

i) Said cam 14 being fixedly attached to said agitator 30, preferably by vibration welding means.

ii) Said top cap 12 being fixedly attached to said auger 18, preferably by a spin weld.

iii) When said cam 14 and the attached agitator 30 oscillate in a counter-clockwise direction, said teeth 28 of said cam 14 engage said balls 16 and displace said balls 16 to the rear of said pocket cavity 24. This displacement allows clearance for passage of said teeth 28, and said cam 14 may move freely within said top cap 12 in the counter clockwise direction, and then is also initially free to move in the clockwise direction.

iv) When said cam 14 and the attached agitator 30 oscillate in a clockwise direction, said balls 16 roll down said cam ledge 26 between said teeth 28 of said cam 14. Said balls 16 wedge between said teeth 28 and said top cap 12, interlocking said cam 14 with said top cap 12 at a first position.

Said top cap 12 as well as the attached auger 18 are then forced to move in a clockwise direction until said agitator 30 ends its movement in the clockwise direction at a second position, and swings back in the counter-clockwise direction, displacing said balls 16 within said pocket cavities 24 once again and allowing said cam 14 to move freely within said top cap 12.

This process continuously repeats itself as the agitator 30 oscillates, allowing the top cap 12 and the attached auger 18 to rotate only in one direction even as the agitator 30 they are attached to oscillates back and forth.

Figure 3A:
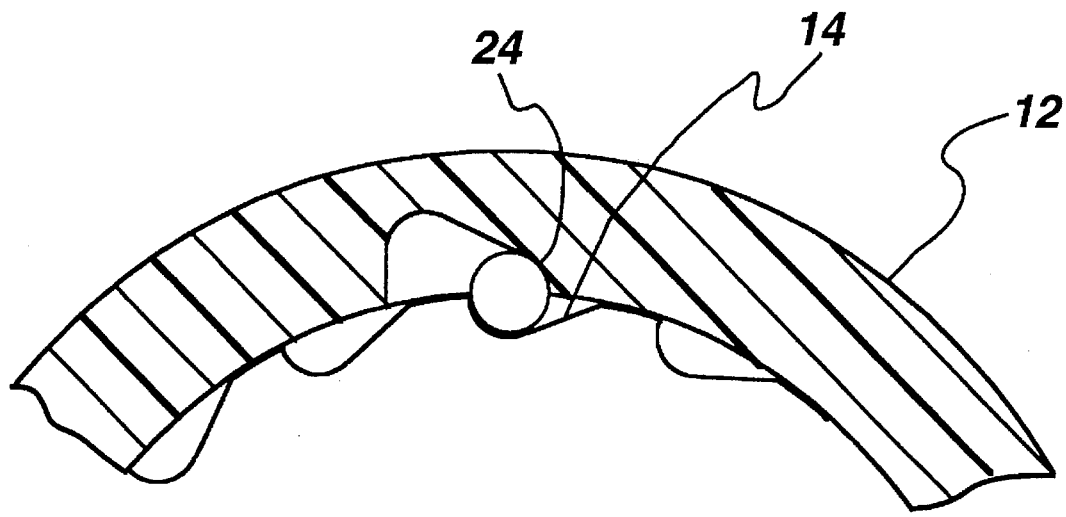
FIGS. 3 (a) and 3 (b) are part of cross-sectional views of two alternative embodiments of a pocket cavity design for the instant invention.
Figure 3B:
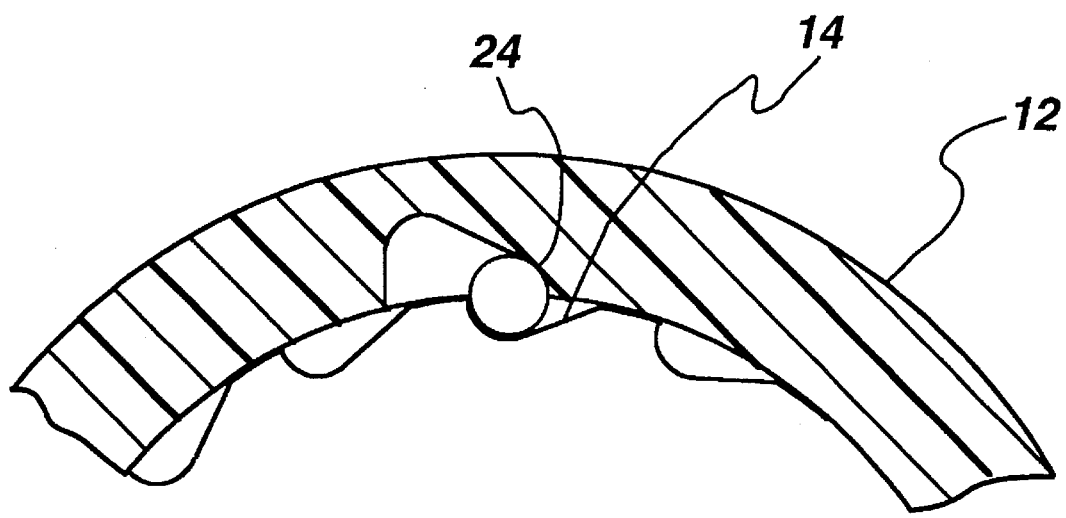

Referring next to FIGS. 3(a) and 3(b) of the drawings, alternative embodiments of said pocket cavity 24 are shown. Each alternative embodiment shown in 3(a) and 3(b), involves a change in the orientation and the geometry of the pocket cavity 24. In said alternate embodiments, the pocket cavities 24 are at an angle. As the angle increases, as in going from the orientation shown in FIG. 3(b) to the orientation shown in FIG. 3(a), the restoring force by which the balls 16 are returned to engage the cam 14 is increased. Accordingly, the maximum restoring force is obtained when the pocket cavity 24 is oriented in the vertical plane.

Figure 4:
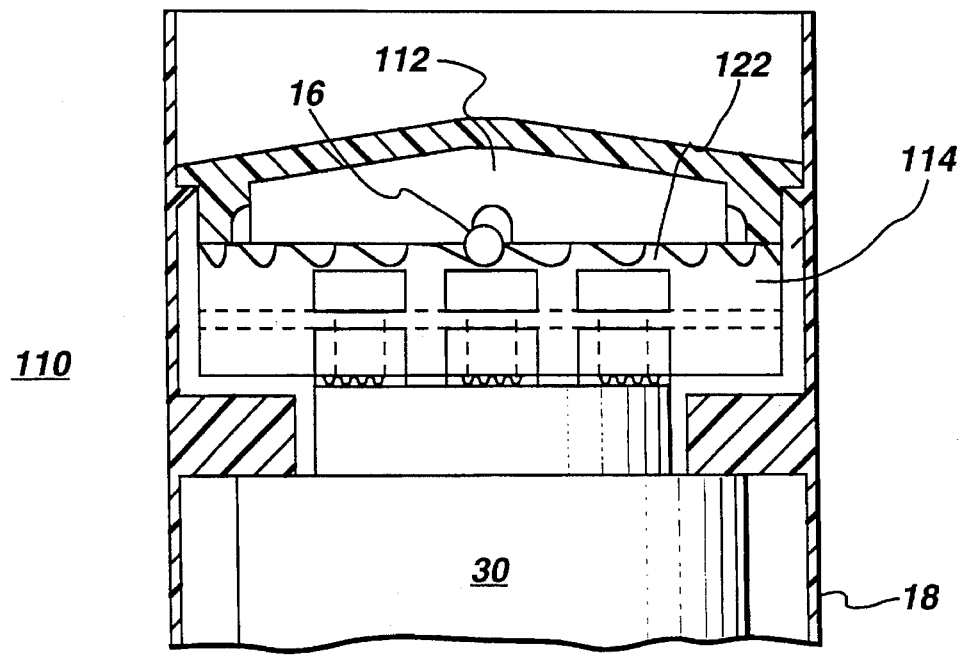
FIG. 4 is a partially cutaway side view of a second embodiment of a ball-type auger ratchet mechanism, the instant invention having a vertical pocket orientation.
Figure 5:
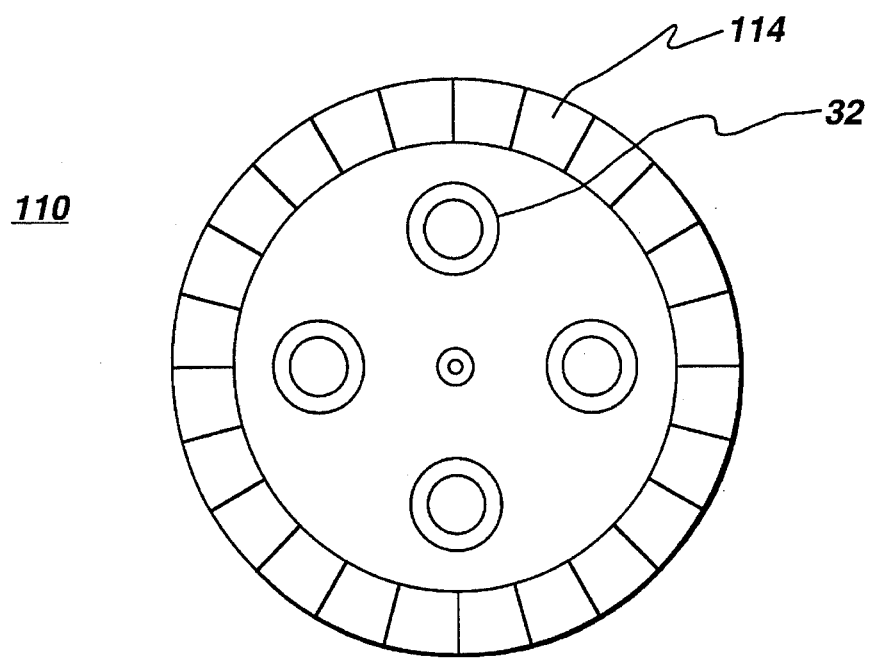
FIG. 5 is a top view of a second embodiment of the instant invention, having a vertical pocket orientation.

Referring now to FIGS. 4 and 5 of the drawings, an alternative embodiment of a ball-type auger ratchet mechanism 110 is depicted which may be employed with a washing machine agitator/auger system. Said alternative embodiment 110 is comprised of a top cap 112, a cam 114, and a plurality of balls 16.

Said alternative embodiment 110 is conceptually similar to the first embodiment 10, however it has some structural differences. In said alternative embodiment of the ball-type auger ratchet mechanism 110, pocket cavities 129 are shown with a vertical orientation as opposed to the horizontal orientation utilized in the first embodiment 10 of the instant invention.

Said cam 114 has teeth 122 which are configured differently within said alternative embodiment 110 of the instant invention. First, said teeth 122 of said cam 114 are directed in a vertical plane as opposed to the horizontal alignment utilized in the previous embodiment 10.

Furthermore, the teeth 122 are designed to begin with a slight incline, opposite the direction of rotational movement of the top cap 112 and attached auger 18, and end with a sharp decline back towards the surface of the cam 114. As the agitator 30 and the attached cam 114 rotate in a counter-clockwise direction, the balls 16 roll up the slight incline of the teeth 122 and are displaced within the vertical pocket cavity 124.

However, as the agitator 30 and the attached cam 114 rotate back in a clockwise direction, the balls 16 fall down between said teeth 122 of said cam 114 and interlock the teeth 122 and the top cap 112.. The top cap 112 and the attached auger 18 are then forced to rotate along with the agitator 30 and the cam 114 in the clockwise direction until the agitator 30 concludes its clockwise motion and swings back in a counter-clockwise direction thereby displacing said balls 16 once again within said vertical pocket cavities 124.

The advantages of having vertically oriented pocket cavities 124 are twofold. First, the possibility of auger 18 "lock-up" due to more than one ball 16 being placed within each pocket cavity 124 during assembly is eliminated. Second, with the pocket cavities 124 oriented in the vertical plane, the restoring force placed on the balls 16 is maximized, thereby effectively eliminating the possibility of the balls 16 getting jammed within the pocket cavities 124.

The foregoing has described several embodiments of a ball-type auger ratchet mechanism which may be used with a washing machine agitator/auger system. While specific embodiments of the present invention have been described, it will be apparent to those skilled in the art that various modifications thereto can be made without departing from the spirit and scope of the invention as defined in the appended claims.

What is claimed is:

1. A ratchet mechanism for converting oscillatory motion of a vertical agitator in first and second opposite rotary directions into unitary motion of an auger in said first direction comprising:

a cylindrical top cap for being joined to said auger and having a top closed end, a bottom open end, and a plurality of pocket cavities extending at least in part vertically;

means for connecting said top cap to said auger comprising a spin weld;

a cam positioned horizontally within said top cap for being joined to said agitator, said cam having a plurality of outwardly extending teeth; and a plurality of balls positioned within said pocket cavities respectively, wherein said balls are displaced upwardly within said pocket cavities at a first position by rotation of said cam in said second direction and said balls fall by gravity to interlock between said cam and said top cap at a second position by rotation of said cam in said first direction.

2. A ratchet mechanism for converting oscillatory motion of a vertical agitator in first and second opposite rotary directions into unitary motion of an auger in said first direction comprising:

a cylindrical top cap for being joined to said auger and having a top closed end, a bottom open end, and a plurality of pocket cavities extending at least in part vertically;

a cam positioned horizontally within said top cap for being joined to said agitator, said cam having a plurality of outwardly extending teeth;

means for connecting said cam to said agitator comprises bosses fixedly joined to said cam; and a plurality of balls positioned within said pocket cavities respectively, wherein said balls are displaced upwardly within said pocket cavities at a first position by rotation of said cam in said second direction and said balls fall by gravity to interlock between said cam and said top cap at a second position by rotation of said cam in said first direction.

3. A ratchet mechanism for converting oscillatory motion of a vertical agitator in first and second opposite rotary directions into unitary motion of an auger in said first direction comprising:

a cylindrical top cap for being joined to said auger and having a top closed end, a bottom open end, and a plurality of pocket cavities extending at least in part vertically;

a cam positioned horizontally within said top cap for being joined to said agitator, said cam having a plurality of outwardly extending teeth;

said teeth have a horizontal orientation, said pocket cavities extend also in part horizontally, and said cam further includes a cam ledge tilted to allow gravity to engage said balls with said teeth in said first direction; and a plurality of balls positioned within said pocket cavities respectively, wherein said balls are displaced upwardly within said pocket cavities at a first position by rotation of said cam in said second direction and said balls fall by gravity to interlock between said cam and said top cap at a second position by rotation of said cam in said first direction.

4. An apparatus comprising:

an oscillatory vertical washing machine agitator;

an auger disposed atop said agitator; and means for ratcheting said auger in a single rotary direction upon bidirectional oscillatory rotation of said agitator including a plurality of driven balls disposed between said agitator and auger;

a top cap fixedly joined to said auger and having a plurality of circumferentially spaced apart pockets;

a cam fixedly joined to said agitator and having a plurality of circumferentially spaced apart teeth disposed adjacent to said pockets; and wherein said balls are disposed in respective ones of said pockets for being driven upwardly therein upon rotation of said cam in one direction, and for falling by gravity to interlock between said teeth and pockets upon rotation of said cam in an opposite direction.

5. An apparatus according to claim 24 wherein said pockets and teeth are configured with complementary arcuate portions to engage respective ones of said balls on diametrically opposite sides thereof to effect said interlock.

6. An apparatus according to claim 24 wherein said teeth extend vertically upwardly for lifting said balls upwardly into said pockets and allowing said balls to drop by gravity between adjacent ones of said teeth during rotation of said cam in said one direction.

7. An apparatus according to claim 24 wherein said teeth extend radially outwardly in a horizontal plane, and further comprising a tilted cam ledge extending circumferentially around said cam adjacent to said teeth and below said pockets for allowing said teeth to drive said balls upwardly therealong into said pockets during rotation of said cam in said one direction.

* * * * *